United States Patent [19]
Lee et al.

[11] Patent Number: 5,245,597
[45] Date of Patent: Sep. 14, 1993

[54] METHOD AND DEVICE FOR CORRECTING TRACK DEVIATION IN OPTICAL DISC DRIVE

[75] Inventors: Cheol-woo Lee; Geon-ho Cho, both of Seoul; Su-han Park, Suwon, all of Rep. of Korea

[73] Assignee: Samsung Electronics Co., Ltd., Kyunggi, Rep. of Korea

[21] Appl. No.: 767,612

[22] Filed: Sep. 30, 1991

[30] Foreign Application Priority Data

Sep. 29, 1990 [KR] Rep. of Korea .................. 90-15819

[51] Int. Cl.$^5$ .............................................. G11B 7/09
[52] U.S. Cl. .................. 369/44.28; 369/44.14; 369/44.29; 369/112
[58] Field of Search ............... 369/44.28, 44.29, 44.32, 369/44.41, 44.13, 44.23, 44.25, 112, 32, 58, 54, 44.14, 43, 44.35; 360/78.05

[56] References Cited

U.S. PATENT DOCUMENTS

| | | | |
|---|---|---|---|
| 4,530,083 | 7/1985 | Ishihara | 369/267 |
| 4,797,866 | 1/1989 | Yoshikawa | 369/44.14 |
| 4,974,220 | 11/1990 | Harada | 369/44.28 |
| 5,003,524 | 3/1991 | Ikeda | 360/78.05 |
| 5,063,549 | 11/1991 | Yamamuro | 369/32 |
| 5,090,002 | 2/1992 | Chow et al. | 369/44.29 |
| 5,148,420 | 9/1992 | Yamamuro | 369/32 |

*Primary Examiner*—Aristotelis Psitos
*Assistant Examiner*—Muhammad Edun
*Attorney, Agent, or Firm*—Rothwell, Figg, Ernst & Kurz

[57] ABSTRACT

Disclosed are a method and a device for correcting a track deviation by the deviation of a disc through a fine seek operation that operates a tracking actuator in a coarse seek stage of an optical disc drive wherein a track cross signal of the disc is detected in the optical pick up during the course seek operation and at the same time by using an optical encoder and a linear scale which are installed separately, a scale cross signal of the linear scale is detected and the actuator is driven by a signal resulting from comparing both the signals. At the stage of the travel of the optical pick up, the track deviation of the disk is corrected, and accordingly the relative speed between the light spot and the track at a seek direction becomes small to facilitate the control of the actuator and not to be necessary for lowering a speed of the VCM used in the coarse seek in order to lower the relative speed. The seek time is shortened so that the position control time between the coarse seek and the fine seek is close to zero.

12 Claims, 5 Drawing Sheets

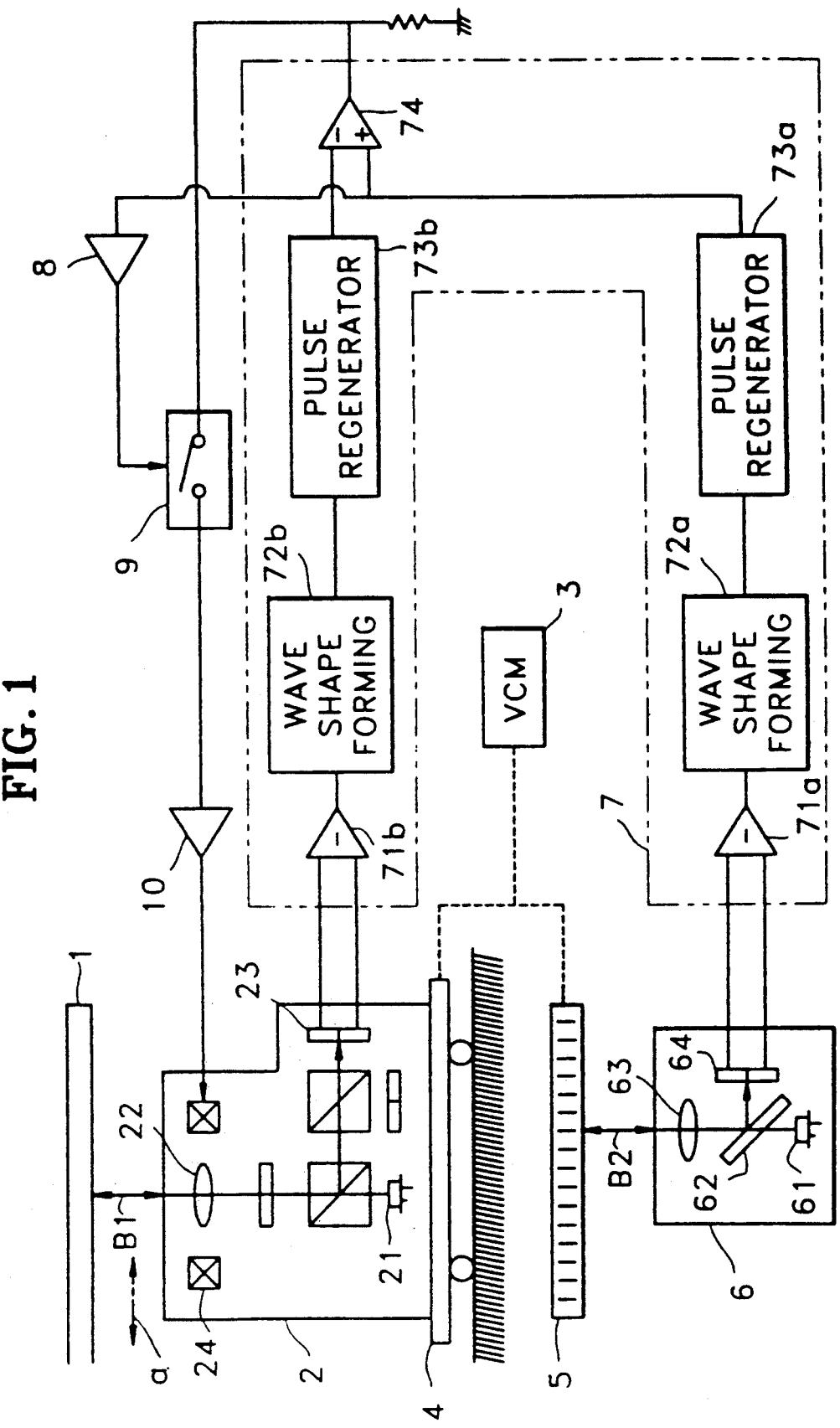

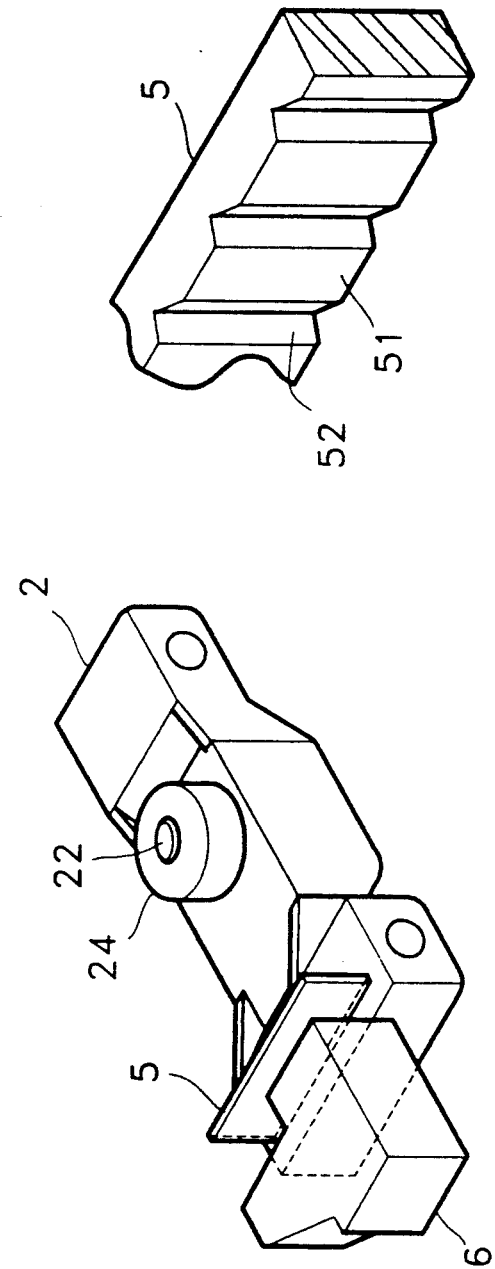

METHOD AND DEVICE FOR CORRECTING TRACK DEVIATION IN OPTICAL DISC DRIVE

BACKGROUND OF THE INVENTION

The present invention relates to a method and device for correcting a track deviation in an optical disc drive, and particularly to a track deviation correcting method and device for accurately positioning a light spot concentrated by an object lens to a target track by driving a tracking actuator during an optical pick up travel.

The optical disc drive is a device that records and/or reproduces data information that is converted into an optical signal by concentrating a laser beam with a certain size onto an optical disc which is a recording media that is responsive to light. This has the advantages of having a large scale memory capacity that exceeds by tens of times that of the existing magnetic recording type hard disc drive (HDD) and a detachable disk as that of a floppy disc drive (FDD), thereby its use is broadened as an auxiliary memory device for a computer. However, in order to sufficiently serve as a computer memory device, an access time similar to that of a HDD is required.

Track access of the optical disc drive is composed of a coarse seek stage and a fine seek stage. The coarse seek, for example, means a stage to transfer an optical pick up to a target track by operating a pick up transfer such as a voice coil motor (VCM). However, unlike the HDD, because track deviation occurs from wobble due to an inferior disc assembly, a light spot formed in the optical pick up cannot match accurately the target track by the coarse seek alone.

Therefore, a position correction with respect to the track deviation must be performed by a fine seek operation rather than a course seek operation. The fine seek means a stage to minutely displace the object lens forming the light spot by driving a separate tracking actuator. This operation continues so that the light spot follows up the track center even after completion of the seek operation.

In order to correct a track deviation that occurs from the disc wobble, the fine seek operation is generally executed after the coarse seek operation is completed. However, this lengthens the overall seek time and the access time which is the seek time plus the disc rotation waiting time, thereby making the realization of high speed access difficult. Accordingly, in order to attain high speed access, there is a requirement to execute the fine seek operation in parallel with the coarse seek stage to correct track deviation so that the light spot is brought closer to the target track position as much as possible by the object lens immediately after the coarse seek has been completed.

Among such conventional methods, there are an actuator deviation synchronizing drive method, a target position information analyzing method and a track counting method.

The actuator deviation synchronizing drive method uses an optic sensor that is installed separately from an optical pick up to detect the amount of disc deviation and feedback the signal detected by the optic sensor to the actuator and drives the actuator in synchronous with the wobble occurring due to the disc deviation. In this method, in order to detect the track cross signal of the disc by means of the optical sensor, the optical sensor must at least be of performance similar to that of the object lens of the light pick up. Accordingly, its unit cost becomes high.

The target position information analyzing method is a method that detects the amount of track deviation in the light pick up and stores it in a memory device, and drives the actuator by a correction signal for a periodical track deviation. This method is sensitive to disc wobble, which reduces its degree of accuracy.

The track counting method is a method that counts a track number of a disc where a light spot crosses in the optic pick up during a seek operation, increases or decreases speed of the VCM used in the course seek operation and transfers controllably the optical pick-up to the target track. This method has the advantage of having the highest degree of accuracy when compared with the above two methods but it is sensitive to disc wobble. This results in frequent errors and a complicated circuit.

In the mean time, in order to load the light spot on the track of the disc, control of a tracking actuator becomes possible when the mutual relative speed between the light spot and the track moving in a seek direction falls below a specified value. However, in the above mentioned conventional methods, the relative speeds are significantly greater because the tracking actuators are all driven by taking a VCM drive signal as a reference signal. In the conventional method, therefore, the speed of the VCM must be reduced in the vicinity of the spot of the course seek completion to allow for the position control time between the course seek and fine seek operations. This position control time generally takes about 5 msec and functions as an obstacle factor to realize a high speed.

SUMMARY OF THE INVENTION

To solve the problems of the conventional arts as described above, it is an object to provide a track deviation correcting method and device that attains a high speed access.

In order to achieve the above object, there is provided a method for correcting a track deviation in an optical disc drive by driving a tracking actuator that displaces an object lens of an optical pick up in order to correct the track deviation occurring due to the disc vibration during a travel of the optical pick up transfer. The method according to the present invention comprises the steps of:

detecting a track cross signal of said optical disc from said pick up;

detecting a scale cross signal that informs an absolute position of said optical pick up from an optic encoder by relatively moving means provided with a separate linear scale and optic encoder at a speed equal to the movement speed of the said optical pick up;

comparing and outputting said track cross signal and said scale cross signal, whereby said compared output signal is fedback to said tracking actuator.

There is also provided a device for correcting a track deviation in an optical disc drive comprising an optical pick up that is installed movably along a seek direction and that includes an optical means for detecting a track cross signal of said disc by scanning a light spot to said disc and a tracking actuator for displacing the position of said light spot, said device comprising: a linear scale for setting absolute position coordinates of said optic pick up;

an optical encoder that includes optical elements for detecting a scale cross signal of said linear scale and is installed to move relatively with respect to said linear scale; and comparator means for comparing and outputting said track cross signal and said scale cross signal, whereby a tracking actuator is driven by the output of said comparator means that compares said track cross and scale cross signals.

BRIEF DESCRIPTION OF THE DRAWINGS

FIG. 1 is a block diagram explaining the structure and the control circuit of an optical disc drive according to the present invention.

FIG. 2 is a perspective view for explaining the connection of the optical encoder, linear scale and optical pick up shown in FIG. 1.

FIG. 3 is a partly enlarged perspective view of the liner scale shown in FIG. 1.

Detailed Description of the Invention

Figure 4:
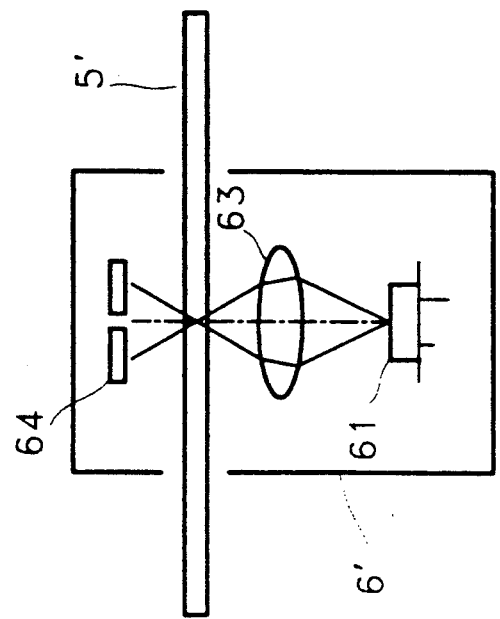
FIG. 4 is a plan view showing an optical arrangement of the optical reflective linear scale and the optical encoder.

The desired embodiment of the present invention will be described below in detail with reference to the accompanying drawings.

In FIG. 1, the disc 1 is rotated at a constant linear speed by a spindle motor that is not shown. Light pick up 2 has a light source 21, object lens 22 that focuses light generated from light source 21 onto disc 1 and an optical means including divided-by-2 light detector 23 for detecting a track cross signal of the disc 1 by detecting the light reflected from the disc 1. Light pick up 2 also has a tracking actuator 24 that controls the position of the light spot by minutely driving the object lens 22.

The optical pick up 2 is mounted on the carriage 4 of the VCM 3 by any suitable means and is installed movably relative to the diametrical direction of the disc 1, that is, a seek direction (a).

Linear scale 5 is installed to translate together with optic pick up 2 by VCM 3 in order to set the absolute position coordinates of the light pick up 2. With reference to FIG. 2, the linear scale 5 is affixed to the body of optical pick up 2 and is moved relatively with respect to an optical encoder separately provided. With reference to FIG. 3, linear scale 5 has a multiplicity of grooves 52 formed with a certain pitch on flat scale land 51. The pitch of grooves 52 is the same as that of the track pitch on disc 1.

Again referring to FIG. 1, optical encoder 6 is made up of the optical elements i.e. light source 61, half mirror 62, focus lens 63 and divided-by-2 light detector 64 in addition to the pick up 2 so that when linear scale 5 moves, a scale cross signal with respect to linear scale 5 is detected.

Figure 5:
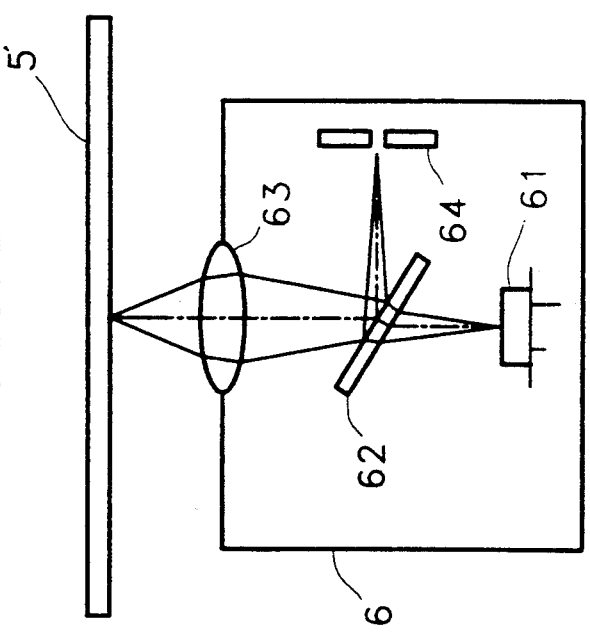
FIG. 5 is a plan view showing an optical arrangement of the optical transmissive linear scale and the optical encoder.

FIG. 4 shows optical encoder 6 with respect to light reflective type linear scale 5 FIG. 5 shows another optical encoder 6' with respect to optical transmissive type linear scale 5'.

The track cross signal detected in the divided-by-2 light detector 23 of optical pick up 2 and the scale cross signal detected in divided-by-2 light detector 64 of optic encoder 6 or 6', are compared in comparator circuit 7 as shown in FIG. 1. The compared signal is then input to tracking actuator 24 via switching circuit 9 that is switched by trigger circuit 8 and amplifier 10.

Here, comparator circuit 7 consists of differential amplifiers 71a and 71b that differentially amplifies respective signals detected in divided-by-2 light detector 64, and 23; waveform shapers 72a and 72b that waveform shape the differentially amplified signals into a sine wave; pulse regenerators 73a and 73b that transform the sine wave into a rectangular wave and comparator 74 that compares and outputs respective compared rectangular pulse signals.

Trigger circuit 8 is connected between one side of pulse regenerator 73a and switching circuit 9.

Figure 6A:
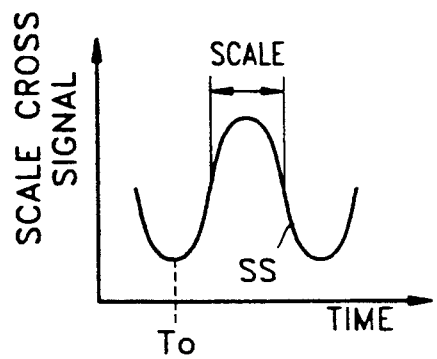
FIGS. 6A through 6C show waveforms of scale cross signals appearing in each section of the comparator circuit.
Figure 7A:
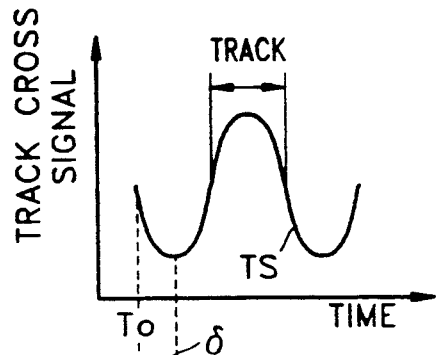
FIGS. 7A through 7C show waveforms of the track cross signals appearing in each section of the comparator circuit.
Figure 6B:
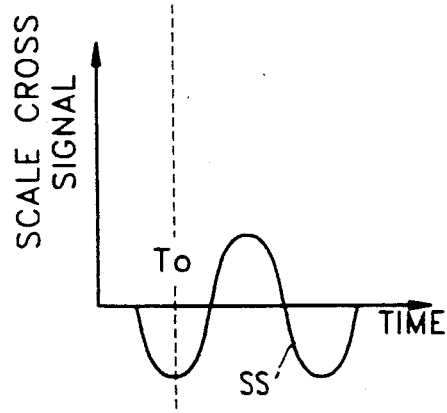
Figure 7B:
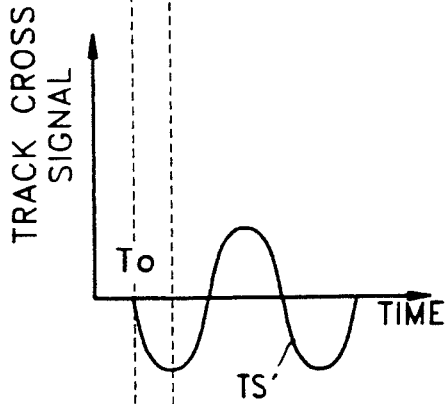
Figure 6C:
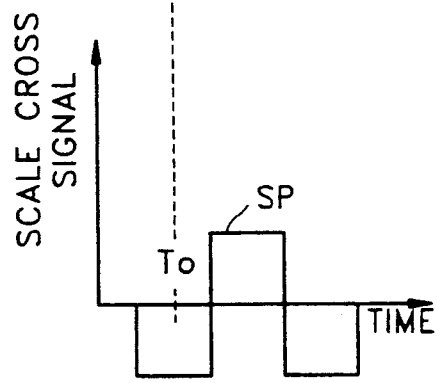
Figure 7C:
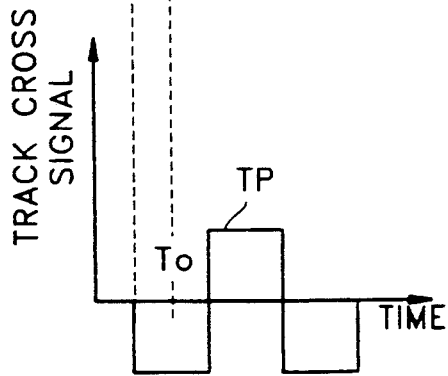

In the above configuration, when VCM 3 operates, optical pick up 2 and linear scale 5 move together in a seek direction (a). The track cross signal is generated as the light beam B1 radiated toward object lens 22 crosses the track of disc 1 is detected by divided-by-2 light detector 23 of the optical pick up 2. Also, the scale cross signal is generated as light beam B2, radiated toward focus lens 63, crosses the grooves 52 of the linear scale 5 and is detected by the divided-by-2 light detector 64 of optical encoder 6. When these signals are differentially amplified in differential amplifiers 71a and 71b, respectively, alternating signals SS and TS as shown in FIGS. 6A and 7A are obtained. These alternating signals SS and TS become sine waves SS' and TS' with no direct current component by waveform shapers 72a and 72b as shown in FIGS. 6B and 7B and are transformed into rectangular pulses SP and TP as shown in FIGS. 6C and 7C by pulse regenerators 73a and 73b.

Figures 8A, 8B, 8C:
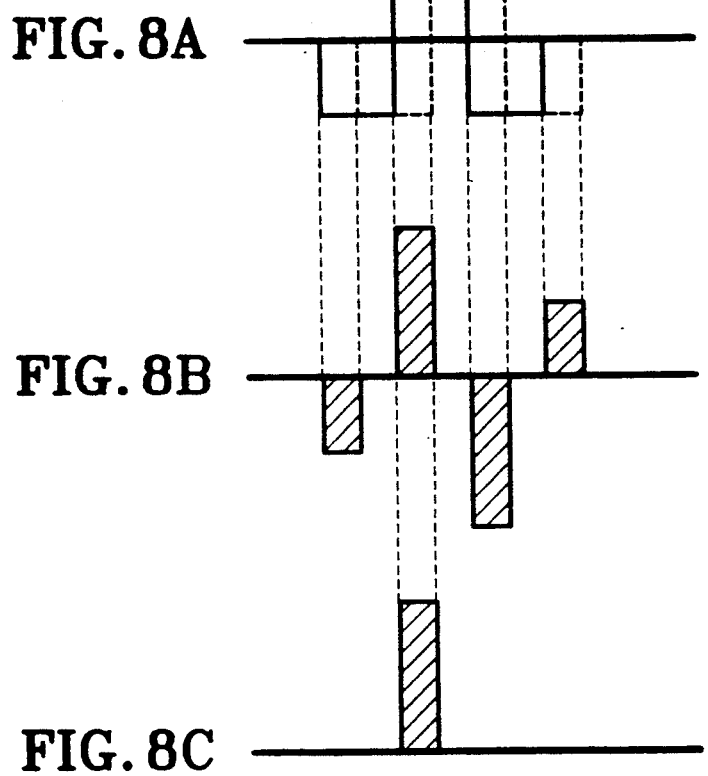
FIGS. 8A through 8C are timing diagrams indicating the signal appearing at the output terminal of the comparator by the phase difference of the scale cross signal and the track cross signal and the signal supplied from the switching circuit to the actuator.

Then, when a track deviation occurs due to the disc deviation at a prescribed moment To, phase difference δ between two signals occurs. The phase difference δ is also maintained in rectangular pulses SP and TP transformed by pulse regenerators 73a and 73b. In comparator 74, a compared signal is output according to the phase difference as shown in FIG. 8B. However, such a signal contains a mixture of positive and negative signal components, and, when this is integrated along the time base, becomes zero. As a result, it is not proper for the drive signal for the tracking actuator 24. Therefore, based on either the rectangular pulse SP of the encoder appearing as the scale cross signal or the rectangular pulse TP of the pick up appearing as the track cross signal, one signal of these two signals must be transformed into an appropriate consolidated drive signal for the tracking actuator 24. FIG. 1 shows the circuit diagram when utilizing the rectangular pulse SP as a reference. That is, trigger circuit 8 turns on switch circuit 9 only when rectangular pulse SP of the encoder has positive time component. So, among the signals shown in FIG. 8B, only the positive components are passed and the drive signal as shown in FIG. 8C is applied to tracking actuator 24 via amplifier 10.

Such a drive signal appears only when there is a mutual phase difference in time between the track cross signal and the scale cross signal. The track deviation due to the wobble of disc 1 is corrected by operating tracking actuator 24 since the phase difference occurs when disc 1 vibrates.

As explained above, in the present invention, whenever the light spot position of the optical pick up crosses the disc track during the coarse seek stage that operates the VCM, correction is made by using a fine seek operation that operates the tracking actuator and relative speed between movements of the light spot and the track is maintained to be close to zero. Therefore, even though the VCM speed is not reduced in the vicinity of the target track, control of the tracking actuator to load the light spot on the target track becomes possible. This means that the coarse seek time is possibly shortened. In addition, since correction is made to enable the light spot position to approach within the target track in the coarse seek stage, the fine seek time during the fine seek stage after the coarse seek becomes extremely short.

The track deviation correcting method and device according to the present invention don't require nearly the position control time between the coarse seek and fine seek operations and also provide the effect of reducing overall seek time by shortening the time of the coarse and fine seek operations. Altogether, an optical disc drive of sufficient performance as a computer memory device is provided by realizing the high speed access, thereby enabling the device to expediently process mass information.

What is claimed is:

1. A device for correcting a track deviation in an optical disc drive comprising an optical pickup that is installed movably along a seek direction of a disc and that includes an optical means for detecting a track cross signal with respect to said disc by scanning a light spot onto said disc and a tracking actuator for displacing the position of said light spot, said device comprising:
   a linear scale for setting absolute position coordinates of said optic pickup;
   an optical encoder that includes optical elements for detecting a scale cross signal and is installed to move relatively with respect to said linear scale; and
   comparator means for comparing said track cross signal and said scale cross signal and for detecting a phase difference between the track cross signal and said scale cross signal, whereby a scale cross signal tracking actuator is driven by an output of said comparator means for correcting the spot position to be as referenced by the spot position on said optic scale when a phase difference between the track cross signal and the scale cross signal is detected.

2. A device as claimed in claim 1, further comprising switching means which is controlled by said scale cross signal and for electrically switching said tracking actuator and said comparator means, whereby only a component output when said scale cross signal is detected among signals output from said comparator means is passed.

3. A device as claimed in claim 1, wherein said linear scale is displaced together with said optical pick up and said optical encoder is installed fixedly.

4. A device as claimed in claim 1, wherein said linear scale is installed fixedly and said optical encoder fixed on said optical pick up moves along said linear scale.

5. A device as claimed in claim 1, wherein only said scale cross signal is used as a tracking actuator drive signal to correct a track error of the light spot on said optic disc.

6. A device as claimed in claim 5, wherein only a portion of said scale cross signal having a positive time component is used as a tracking actuator drive signal to correct a track error of the light spot on said optic disc.

7. A device as claimed in claim 1, wherein only said track cross signal is used as a tracking actuator drive signal to correct a track error of the light spot on said optic disc.

8. A device as claimed in claim 7, wherein only a portion of said track cross signal having a positive time component is used as a tracking actuator drive signal to correct a track error of the light spot on said optic disc.

9. A device as claimed in claim 1, further comprising a driving state triggering means which enables the tracking actuator to be driven by said output of said comparator means to correct a track error of the light spot on said optic disc.

10. A device as claimed in claim 9, wherein said driving state triggering means enables said tracking actuator to be driven by said output of said comparator means only when said track cross signal or said scale cross signal has a positive time component.

11. A method for correcting a track deviation in an optical disc drive by driving a tracking actuator that displaces an object lens of an optical pickup in order to correct the track deviation occurring due to disc vibration, said method comprising the steps of:
   detecting a track cross signal of said optical disc from said optical pickup which is obtained from a tracking error signal in a photodetector of said optical pick up during the transfer of the optical pickup to a target track;
   detecting a scale cross signal of a linear scale which moves relative to said optical pickup at a speed substantially equal the movement speed of said optical pickup by an optic encoder; and
   comparing said track cross signal and said scale cross signal with a comparator means and outputting a comparison signal, said comparison signal being fedback to said tracking actuator to correct the spot position on said optic disk to be as referenced by the spot position on said optic scale when a phase difference between said cross track signal and said scale cross signal is detected by the comparator means.

12. The method as claimed in claim 11, wherein when said scale cross signal is compared with said track cross signal by said comparator means, only said scale cross signal is used as a tracking actuator drive signal during a coarse-seek motion of said pick up to correct a track error of the light spot on said optic disc.

* * * * *